(12) United States Patent
Yamagiwa et al.

(10) Patent No.: US 11,086,505 B2
(45) Date of Patent: Aug. 10, 2021

(54) PROGRAM, INFORMATION PROCESSING DEVICE, AND CONTROL METHOD FOR THE SAME

(71) Applicant: Sony Interactive Entertainment Inc., Tokyo (JP)

(72) Inventors: Masaaki Yamagiwa, Tokyo (JP); Teruyuki Toriyama, Tokyo (JP); Hidetaka Miyazaki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 44 days.

(21) Appl. No.: 16/377,486

(22) Filed: Apr. 8, 2019

(65) Prior Publication Data

US 2019/0346984 A1  Nov. 14, 2019

(30) Foreign Application Priority Data

May 11, 2018  (JP) .............................. JP2018-092246

(51) Int. Cl.
*G06F 3/0481* (2013.01)
*G06F 3/0486* (2013.01)
(Continued)

(52) U.S. Cl.
CPC ............ *G06F 3/0486* (2013.01); *G06F 3/012* (2013.01); *G06F 3/0482* (2013.01);
(Continued)

(58) Field of Classification Search
CPC ........ G06F 3/011; G06F 3/012; G06F 3/0486; G06F 3/0482; G06F 3/0415;
(Continued)

(56) References Cited

U.S. PATENT DOCUMENTS 5,689,628 A * 11/1997 Robertson ........... G06F 3/04815
345/427
5,847,709 A * 12/1998 Card .................. G06F 3/04815
715/850

(Continued)

FOREIGN PATENT DOCUMENTS

JP  2005-107963 A  4/2005
JP  2010-176232 A  8/2010
JP  2014-071736 A  4/2014

OTHER PUBLICATIONS

"A Township Tale—Quick Look: Inventory" video, published on YouTube on Dec. 13, 2017 by A Township Tale, available at: https://youtu.be/Jh5yiuNhj1M (3 minutes and 30 seconds). (Year: 2017).*

(Continued)

*Primary Examiner* — Dino Kujundzic
(74) *Attorney, Agent, or Firm* — Katten Muchin Rosenman LLP

(57) ABSTRACT

Disclosed herein is a program for controlling an information processing device that receives an operation on an object to be possessed disposed in a virtual space from a user, the program causing the information processing device to execute rendering a spatial image that depicts an aspect of an interior of the virtual space on a basis of a position and a direction of a given viewpoint, receiving a housing operation of adding the object to be possessed to user's personal belongings from the user, and controlling so as to dispose a list of personal belongings to which the object to be possessed has been added at a position in the virtual space determined depending on the position and the direction of the viewpoint at a time of receiving the housing operation.

6 Claims, 4 Drawing Sheets

(51) Int. Cl.
   *G06F 3/0482*   (2013.01)
   *G06F 3/01*     (2006.01)
   *A63F 13/23*    (2014.01)
   *A63F 13/213*   (2014.01)
(52) U.S. Cl.
   CPC ............ *A63F 13/213* (2014.09); *A63F 13/23* (2014.09); *A63F 2300/1025* (2013.01); *A63F 2300/1087* (2013.01)
(58) Field of Classification Search
   CPC .. G06F 3/04842; A63F 13/213; A63F 13/211; A63F 13/212; A63F 13/23; A63F 2300/1087; A63F 13/25
   See application file for complete search history.

(56) References Cited

U.S. PATENT DOCUMENTS

| | | | | |
|---|---|---|---|---|
| 2005/0144093 | A1* | 6/2005 | Kassan | G06Q 30/0641 705/26.3 |
| 2012/0113140 | A1* | 5/2012 | Hilliges | G06F 3/017 345/633 |
| 2014/0282162 | A1* | 9/2014 | Fein | G06F 3/013 715/769 |
| 2015/0058759 | A1* | 2/2015 | Shimizu | G06F 3/04842 715/761 |
| 2017/0228130 | A1* | 8/2017 | Palmaro | G06F 3/0485 |

OTHER PUBLICATIONS

Konstantin Wegner et al., "Comparison of Two Inventory Design Concepts in a Collaborative Virtual Reality Serious Game," 2017, CHI PLAY'17 Extended Abstracts, Oct. 15-18, 2017, Amsterdam, NL, pp. 323-329. (Year: 2017).*

Andrey Krekhov, "How to Improve Your Virtual Experience—Exploring the Obstacles of Mainstream VR," Dec. 18, 2019, Cummulative Dissertation, University of Duisburg-Essen. Duisburg, Germany, pp. 1-68. (Year: 2019).*

Japanese Office Action dated Mar. 24, 2020, for the Corresponding Japanese Patent Application No. 2018-092246.

* cited by examiner

PROGRAM, INFORMATION PROCESSING DEVICE, AND CONTROL METHOD FOR THE SAME

BACKGROUND

The present disclosure relates to a program, an information processing device, and a control method for the same for rendering an image that depicts an aspect in a virtual space.

In a computer game, various objects are disposed in a virtual space, an image that depicts an aspect of disposing the objects is rendered, and the image is presented to a user. According to such a technique, the aspect of viewing the virtual space from a viewpoint position set in the virtual space to a given visual line direction is rendered. Changing this viewpoint position and the visual line direction in response to a user's instruction enables a user to view the aspect of the virtual space with presence as if the user actually moved around in the virtual space. Furthermore, the user can realize operations on the objects disposed in the virtual space by, for example, operating a user's owned operation device.

SUMMARY

According to the related-art technique described above, an operation of user's acquiring any of the objects disposed in the virtual space and adding the object to user's personal belongings is often received. A method of realizing a user interface corresponding to such an operation in the virtual space has not been considered sufficiently yet.

The present disclosure has been achieved in the light of the above circumstances and it is desirable to provide a program, an information processing device, and a control method for the same capable of realizing an operation of acquiring an object in a virtual space in a user friendly manner.

A program according to an embodiment of the present disclosure is a program for controlling an information processing device that receives an operation on an object to be possessed disposed in a virtual space from a user, the program including: by a spatial image rendering section, rendering a spatial image that depicts an aspect of an interior of the virtual space on a basis of a position and a direction of a given viewpoint; by an operation receiving section, receiving a housing operation of adding the object to be possessed to personal belongings of the user from the user; and by an object control section, controlling so as to dispose a list of personal belongings to which the object to be possessed has been added at a position in the virtual space determined depending on the position and the direction of the viewpoint at a time of receiving the housing operation. This program may be stored in a computer readable non-transitory storage medium and provided.

An information processing device according to another embodiment of the present disclosure is an information processing device receiving an operation on an object to be possessed disposed in a virtual space from a user, including a spatial image rendering section rendering a spatial image that depicts an aspect of an interior of the virtual space on the basis of a position and a direction of a given viewpoint, an operation receiving section receiving a housing operation of adding the object to be possessed to personal belongings of the user from the user, and an object control section disposing a list of personal belongings to which the object to be possessed has been added at a position in the virtual space determined depending on the position and the direction of the viewpoint at a time at which the operation receiving section receives the housing operation.

A control method for an information processing device according to a further embodiment of the present disclosure is a control method for an information processing device that receives an operation on an object to be possessed disposed in a virtual space from a user, the control method including rendering a spatial image that depicts an aspect of an interior of the virtual space on the basis of a position and a direction of a given viewpoint, receiving a housing operation of adding the object to be possessed to personal belongings of the user from the user, and disposing a list of personal belongings to which the object to be possessed has been added at a position in the virtual space determined depending on the position and the direction of the viewpoint at a time of receiving the housing operation.

DETAILED DESCRIPTION OF THE PREFERRED EMBODIMENTS

Embodiments of the present disclosure will be described hereinafter in detail with reference to the drawings.

Figure 1:
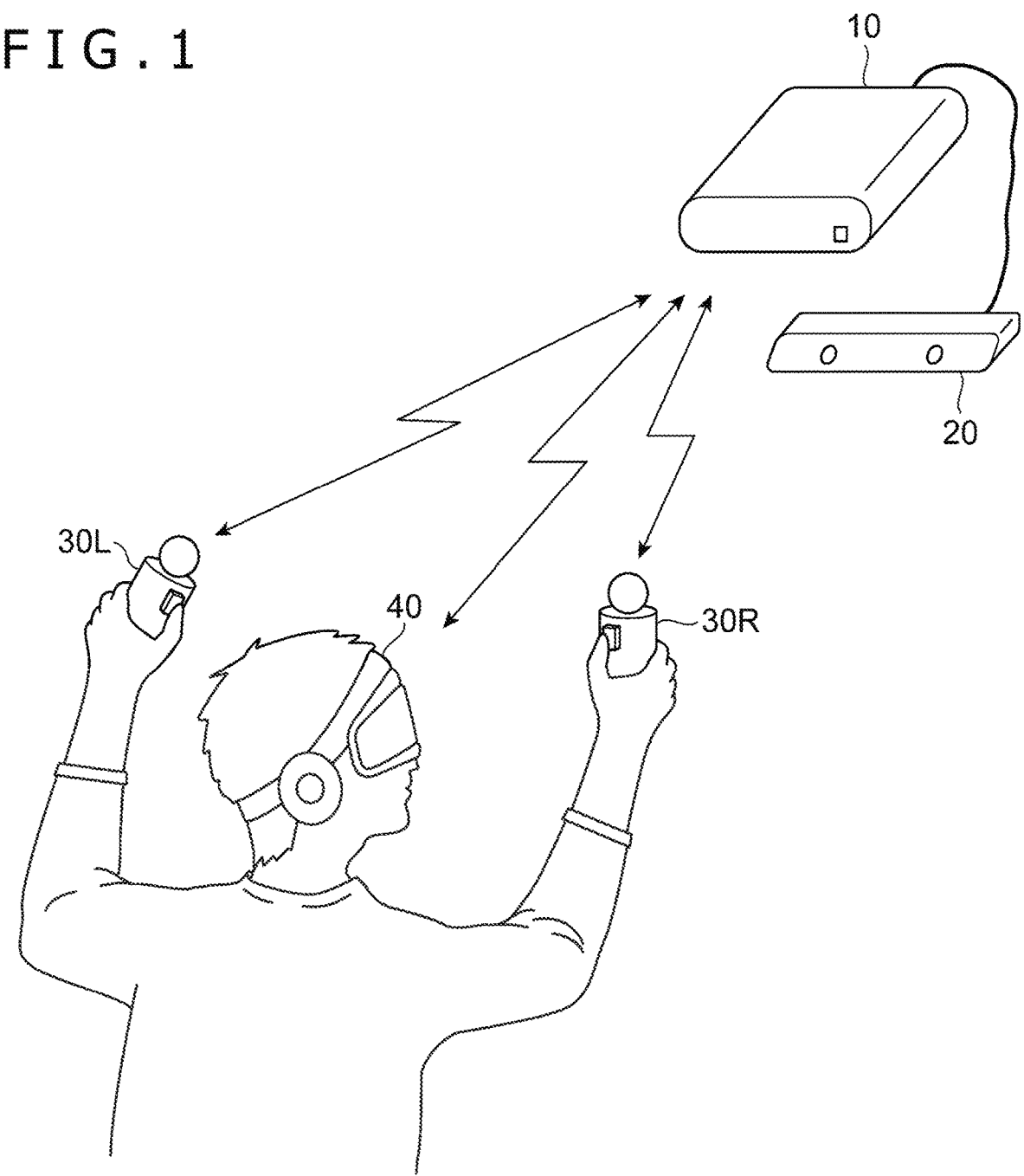
FIG. 1 is an overall schematic diagram of a video display system including an information processing device according to an embodiment of the present disclosure.
Figure 2:
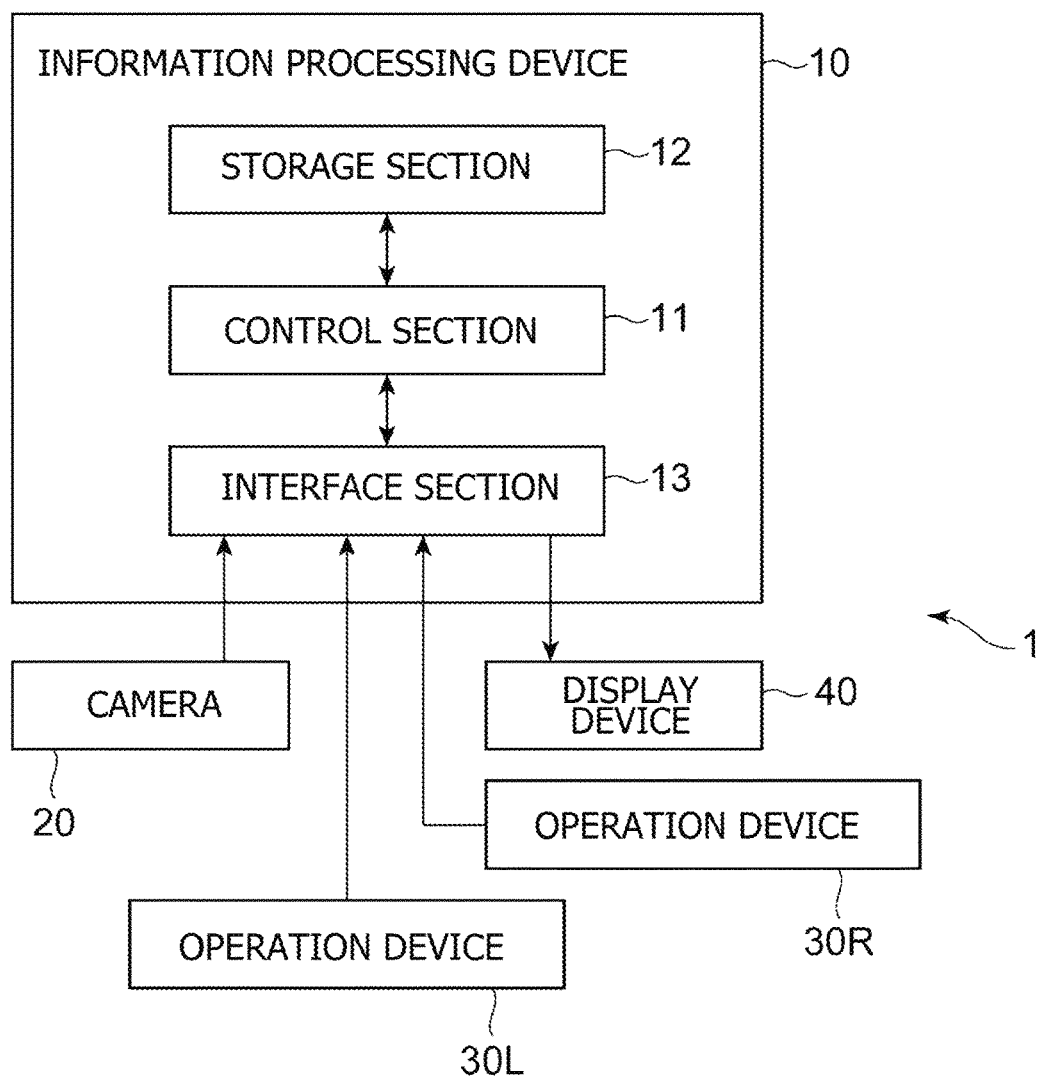
FIG. 2 is a configuration block diagram of the video display system.

FIG. 1 is an overall schematic diagram of a video display system 1 including an information processing device 10 according to an embodiment of the present disclosure. Further, FIG. 2 is a configuration block diagram depicting a configuration of the video display system 1. As depicted in FIGS. 1 and 2, the video display system 1 includes the information processing device 10, a camera 20, two operation devices 30R and 30L, and a display device 40.

The information processing device 10 is a device that supplies a video to be displayed by the display device 40, and may be, for example, a home video game machine, a portable video game machine, a personal computer, a smartphone, or a tablet. As depicted in FIG. 2, the information processing device 10 includes a control section 11, a storage section 12, and an interface section 13.

The control section 11, which is a central processing unit (CPU) or the like, executes a program stored in the storage section 12 and executes various information processes. It is noted that specific examples of the processes executed by the control section 11 in the present embodiment will be described later. The storage section 12, which includes a memory device such as a random-access memory (RAM), stores the program executed by the control section 11 and data processed by the program.

The interface section 13 is an interface for data communication of the information processing device 10 with the camera 20, the operation devices 30R and 30L, and the display device 40. The information processing device 10 is connected to the camera 20, the operation devices 30R and 30L, and the display device 40 via the interface section 13 by either wired or wireless connection. Specifically, the interface section 13 is assumed to include a multimedia interface such as a high-definition multimedia interface (HDMI) (registered trademark) for transmitting a video and a sound supplied from the information processing device 10 to the display device 40. Further, the interface section 13 includes a data communication interface such as a universal serial bus (USB) for receiving video data captured by the camera 20 and signals indicative of contents of user's operation inputs given to the operation devices 30R and 30L.

The camera 20, which is installed in front of a user who uses the video display system 1, captures a video containing the user and a periphery of the user. Particularly in the present embodiment, the camera 20 is assumed as a stereo camera and includes two imaging elements disposed to be apart from each other at a predetermined distance. Analyzing a difference (parallax) between images simultaneously captured by the two imaging elements enables the information processing device 10 to measure a distance to a substance present within a visual field of the camera 20. In other words, the camera 20 functions as a distance image sensor that can detect the distance to the substance present within the visual field of the camera 20. The information processing device 10 identifies positions of the operation devices 30R and 30L and the display device 40 in a real space by analyzing images captured by the camera 20.

The operation devices 30R and 30L are devices for receiving an operation input from the user, and operation members such as operation buttons are disposed on a surface of each of the operation devices 30R and 30L. The user gives operation inputs to the operation members by gripping the operation devices 30R and 30L by hands or wearing the operation devices 30R and 30L around the hands. Particularly in the present embodiment, it is assumed that the user operates the operation device 30R by the right hand and operates the operation device 30L by the left hand. The operation devices 30R and 30L each transmit an operation signal indicative of a content of the user's operation input to the information processing device 10.

Furthermore, the operation devices 30R and 30L in the present embodiment are each provided with a light-emitting section and configured to emit light from the light-emitting section. Imaging the light from this light-emitting section by the camera 20 enables the information processing device 10 to identify the positions of the operation devices 30R and 30L in the real space.

The display device 40, which is a video display device used by user's wearing the display device 40 on the head, displays a video in response to a video signal transmitted from the information processing device 10 and allows the user to view the video. In the present embodiment, the display device 40 is capable of ensuring that the user views the video with both eyes and is assumed to display videos in front of the user's right and left eyes independently of each other. The display device 40 can thereby present the user with a stereoscopic vision using the parallax.

It is also assumed that a light-emitting section is provided on a front surface of the display device 40 similarly to the operation devices 30R and 30L. Imaging light from this light-emitting section by the camera 20 enables the information processing device 10 to identify the position of the display device 40 in the real space. Particularly in the present embodiment, a plurality of light-emitting sections are provided on the front surface of the display device 40, and identifying a position relationship between these light-emitting sections enables the information processing device 10 to identify a change in a posture of the display device 40. The information processing device 10 can thereby identify a change in a direction of a user's face when the user moves the user's head to change the direction of the face.

Figure 3:
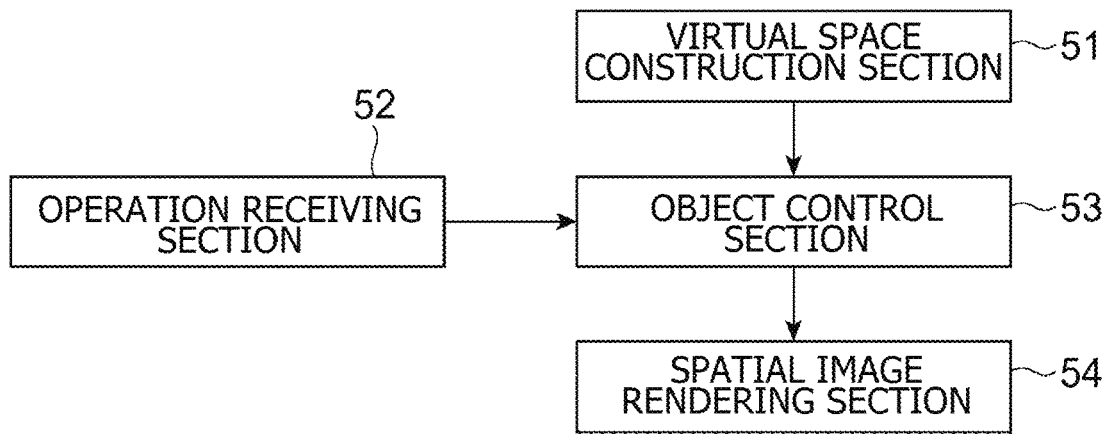
FIG. 3 is a functional block diagram of the information processing device.

Functions realized by the information processing device 10 will next be described with reference to FIG. 3. As depicted in FIG. 3, the information processing device 10 functionally includes a virtual space construction section 51, an operation receiving section 52, an object control section 53, and a spatial image rendering section 54. These functions are realized by causing the control section 11 to execute the program stored in the storage section 12. This program may be provided to the information processing device 10 via a communication network such as the Internet, or may be stored in a computer readable information recording medium such as an optical disk and provided to the information processing device 10.

The virtual space construction section 51 constructs the virtual space in which various objects are disposed and controls behaviors of the objects disposed therein. It is assumed in the present embodiment that the information processing device 10 realizes a game proceeding while the user observes and operates the various objects disposed in the virtual space. The virtual space construction section 51 disposes objects representing characters and goods appearing in this game in the virtual space. In addition, a viewpoint that serves as a reference position at a time of rendering a spatial image, to be described later, is disposed in the virtual space. Furthermore, a visual line direction is set to the viewpoint.

Particularly in the present embodiment, the video display system 1 makes a setting such that an operation of user's gripping by the hand and moving part of the objects disposed in the virtual space can be executed. Furthermore, the video display system 1 makes a setting such that part of or all of the objects that can be operated in this way can be possessed by the user as items (personal belongings). An object that can be possessed by the user will be referred to as "object to be possessed O," hereinafter. The user can add the object to be possessed O to the user's personal belongings by performing a housing operation, to be described later, on the object to be possessed O disposed in the virtual space. Moreover, the user can operate the object to be possessed O in the virtual space again by performing a takeout operation of taking out the object to be possessed O housed as a personal belonging. The user can thereby cause a game to proceed by, for example, possessing the object to be possessed O disposed in the virtual space and using the object to be possessed O at a different location. Contents of the housing operation and the takeout operation will be described later in detail.

The operation receiving section 52 receives an instruction operation on the object to be possessed O from the user. Specifically, in the present embodiment, the user performs the instruction operation by moving the operation devices 30R and 30L held by both hands or operating the operation members disposed on the surfaces of the operation devices 30R and 30L. As described above, analyzing the images captured by the camera 20 enables the operation receiving section 52 to identify the positions of the operation devices 30R and 30L in the real space. The operation receiving section 52 receives a change in the positions as a type of the user's instruction operation.

It is also assumed that the operation receiving section 52 receives a viewpoint change instruction to change a position or a direction of the viewpoint set in the virtual space from the user. This viewpoint change instruction may be realized by operating a predetermined operation member provided on the operation device 30R or 30L. Furthermore, the operation receiving section 52 may receive an operation of user's moving the user's face as a viewpoint change instruction. Specifically, the operation receiving section 52 identifies a change in the position and a direction of the display device 40 identified by analyzing the images captured by the camera 20. An identified content is supposed to correspond to a motion of the user's face. The operation receiving section 52 receives this change in the position and the direction of the display device 40 as a type of the viewpoint change instruction.

The object control section 53 executes control to move the object to be possessed O disposed in the virtual space or to change a state of the object to be possessed O in response to the content of the operation received by the operation receiving section 52 from the user.

Furthermore, the object control section 53 changes the position and the direction of the viewpoint set in the virtual space in response to the user's viewpoint change instruction. Changing the position and the direction of the viewpoint in an interlocked manner with the change in the position and the direction of the display device 40 and user's making a motion to actually look around the user, in particular, enable the user to grasp a peripheral aspect in the virtual space.

The spatial image rendering section 54 renders a spatial image that depicts an aspect of viewing an interior of the virtual space from the viewpoint the position and the direction of which are changed by the object control section 53, and outputs the spatial image to the display device 40. Displaying this spatial image by the display device 40 enables the user to see an aspect of viewing the interior of the virtual space from the viewpoint moved in response to the user's own viewpoint change instruction. It is assumed that the spatial image rendering section 54 renders two images depicting the aspect of viewing the interior of the virtual space from two viewpoint cameras arranged right and left across the position of the viewpoint. The user can recognize the aspect of the interior of the virtual space in three dimensions by viewing these images with the left and right eyes, respectively.

Contents of user's operations on the object to be possessed O and contents of control executed by the object control section 53 in response to the contents will now be described. It is assumed that hand objects HR and HL corresponding to the user's right and left hands are disposed in the virtual space so that the user can operate the various objects disposed in the virtual space. When the user moves the user's hands in a state of holding the operation devices 30R and 30L, the operation receiving section 52 identifies motions of the operation devices 30R and 30L and the object control section 53 moves the hand objects HR and HL in the virtual space in an interlocked manner with the motions. The user can thereby cause the hand object HR or HL to come close to or touch the various objects disposed in the virtual space.

Figure 4:
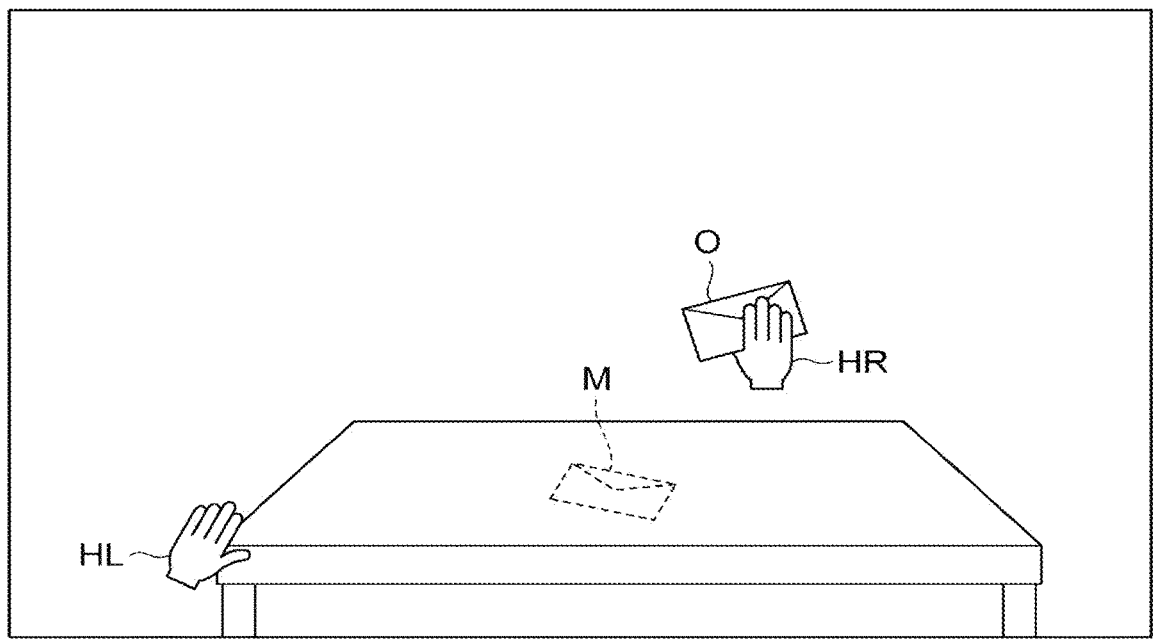
FIG. 4 depicts a state in which a user grips an object to be possessed.

User's performing an operation of depressing a predetermined operation button (hereinafter, referred to as "trigger button") disposed on the operation device 30R in a state in which the hand object HR comes close to the object to be possessed O enables the user to grip the object to be possessed O by the hand object HR. In the present embodiment, it is assumed that the hand object HR keeps gripping the object to be possessed O while the user depresses the trigger button. User's moving the right hand in the state enables the user to move the object to be possessed O in the virtual space. FIG. 4 depicts a state in which the user grips and moves the object to be possessed O (a letter in FIG. 4) by the hand object HR. It is assumed herein that the user operates the trigger button on the operation device 30R by the right hand and grips the object to be possessed O. However, since a trigger button is similarly provided on the operation device 30L, it is assumed that the user can execute a similar operation as that described herein also by the left hand.

A marker M in FIG. 4 denotes a location where the object to be possessed O was disposed just before the user grips the object to be possessed O. When the user performs a release operation of releasing the object to be possessed O in the vicinity of the location where this marker M is displayed, the object control section 53 disposes the object to be possessed O again at the location where the marker M has been displayed. It is noted that the marker M starts to be displayed at timing of user's performing the operation of gripping the object to be possessed O, and stops to be displayed at timing of user's performing the release operation to return the object to be possessed O to an original position.

The release operation in this example may be an operation of releasing the trigger button kept to be depressed while the user is gripping the object to be possessed O. In other words, moving the operation device 30R while keeping to depress the trigger button in the real space enables the user to move the object to be possessed O to an arbitrary location, and taking the user's finger off the trigger button in the vicinity of the marker M enables the user to release the object to be possessed O and to return the object to be possessed O to the original location. This is close to an action at a time of person's actually gripping or putting a thing in the real space. Thus, according to such an operation method, the user can operate the object to be possessed O in the virtual space without a feeling of strangeness.

Moreover, it is assumed that in a case of user's performing the release operation at a position other than neighborhoods of the marker M, the object control section 53 adds the object to be possessed O to the user's personal belongings. In other words, user's performing the release operation of releasing the object to be possessed O at a location other than a predetermined range in the vicinity of the marker M corresponds to the housing operation described above. In a case in which the operation receiving section 53 receives the release operation, the object control section 53 determines whether to re-dispose the object to be possessed O in the virtual space or to add the object to be possessed O to the personal belongings depending on the position at which the release operation has been performed.

When the user performs the housing operation (that is, the release operation of releasing the object to be possessed O), the object control section 53 hides the marker M and disposes a list of personal belongings in the virtual space. The list of personal belongings in the present embodiment is configured such that plates P indicating housing locations of the personal belongings and small objects (thumbnail objects) indicating the respective personal belongings are arrayed. Moreover, the object control section 53 adds a thumbnail object representing the object to be possessed O on which the housing operation is performed to this list of personal belongings. Rendering an aspect of the virtual space in which such a list of personal belongings is disposed by the spatial image rendering section 54 enables the user to grasp that the object to be possessed O has been added to the user's personal belongings.

Figure 5:
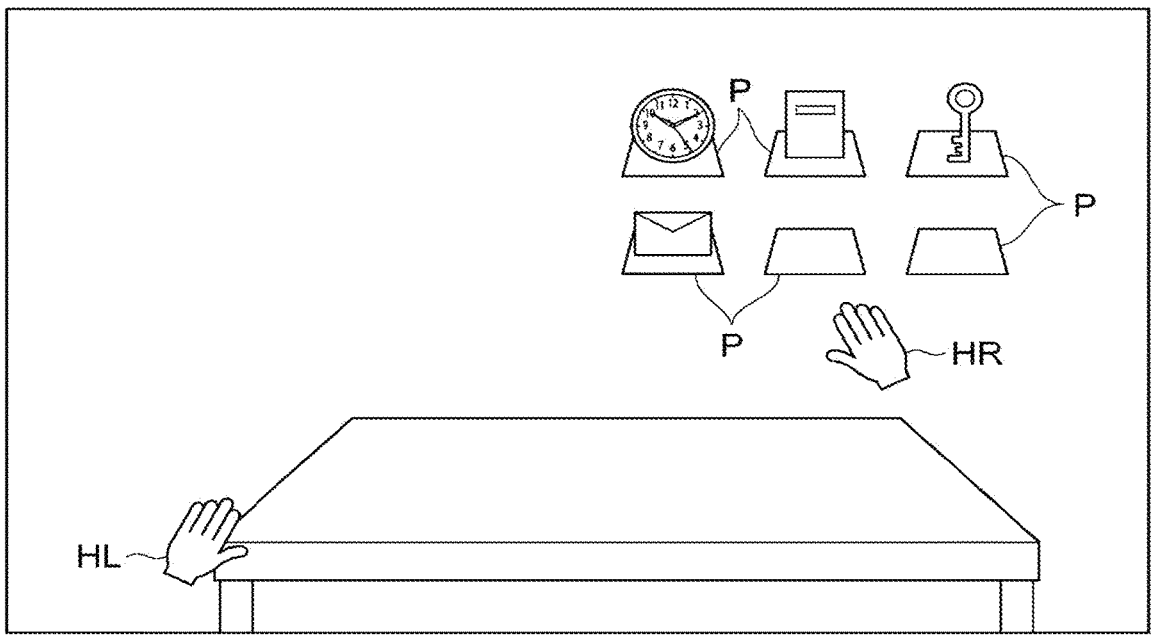
FIG. 5 depicts a state of displaying a list of personal belongings.

FIG. 5 depicts a display example in a case in which the user has performed the housing operation in a state depicted in FIG. 4. In FIG. 5, the plates P that serve as locations of housing the personal belongings by two rows in a longitudinal direction and by three columns in a lateral direction, six plates P in total are disposed, and the thumbnail objects representing the personal belongings are disposed on part of the plates P. Furthermore, the thumbnail object representing the letter that is the object to be possessed O which have been gripped by the user in FIG. 4 is displayed as one of the personal belongings. In a case of user's moving the face to move the position of the viewpoint in the virtual space in this state, the list of personal belongings remains fixed at an initial position of disposing the list of personal belongings in the virtual space. Thus, the user can visually recognize the list of personal belongings from a different angle similarly to the other objects in the virtual space.

A disposing position at a time of disposing the list of personal belongings in the virtual space is determined depending on the position and the direction of the viewpoint at least at display timing. More specifically, the object control section 53 determines the position and a direction of the list of personal belongings so that the list of personal belongings is displayed at a height and a distance at which the list of personal belongings is easy for the user to view with the position and the direction of the viewpoint set as a reference position and a reference direction. In FIG. 5, the plates P and the thumbnail objects representing the personal belongings are disposed side by side along a plane in the virtual space intersecting the direction of the viewpoint.

Moreover, the object control section 53 may determine the disposing position of the list of personal belongings depending on the position of the object to be possessed O at timing of user's performing the housing operation. In the example of FIG. 5, the list of personal belongings is displayed in the vicinity of the position at which the hand object HR has gripped the object to be possessed O at timing of receiving the housing operation on the object to be possessed O. In this way, disposing the list of personal belongings at a location corresponding to the position of the object O at the timing of performing the housing operation enables the user to easily grasp that the object to be possessed O has been added to the list of personal belongings by the housing operation.

Furthermore, the object control section 53 may determine the disposing position of the list of personal belongings depending on which hand has been used by the user for the housing operation. Specifically, in a case of performing the housing operation on the operation device 30R held by the right hand, the list of personal belongings is disposed at a predetermined position rightward in a view from the user. In a case of performing the housing operation on the operation device 30L held by the left hand, the list of personal belongings is disposed at a predetermined position leftward in the view from the user.

It is noted that the object control section 53 may delete the list of personal belongings in a case in which predetermined time passes since the list of personal belongings was displayed or in which the user performs an operation allocated, in particular, to deletion of the list of personal belongings. Furthermore, the object control section 53 may delete the list of personal belongings in a case in which the list of personal belongings disappears from a user's sight as a result of user's moving the user's head or performing the viewpoint change instruction.

While it has been described above that the list of personal belongings is displayed by user's performing the housing operation, the object control section 53 may also display the list of personal belongings in a case of user's performing another operation allocated to display of the list of personal belongings (for example, a button depressing operation for the list of personal belongings).

User's operating the hand object HR or HL to come close to any of the thumbnail objects in the list of personal belongings and performing an operation of depressing the trigger button to grip the thumbnail object in a state of displaying the list of personal belongings make it possible to create a state of gripping the object to be possessed O corresponding to the thumbnail object by the hand object HR or HL. In other words, the operation of gripping any of the thumbnail objects in the list of personal belongings corresponds to the takeout operation described above. Furthermore, in a case of user's gripping any of the objects to be possessed O in the state of displaying the list of personal belongings such as a state right after the takeout operation, user's performing the release operation in the vicinity of a free plate P (plate P where no thumbnail object is disposed) enables the user to dispose the object to be possessed O on the plate P. In other words, similarly to a case in which the list of personal belongings is not displayed, the release operation of releasing the object to be possessed O corresponds to the housing operation of adding the object to be possessed O to the personal belongings even during the display of the list of personal belongings. While it is assumed herein that the thumbnail object corresponding to the object to be possessed O is disposed on the plate P by performing the release operation in the vicinity of the free plate P, the present disclosure is not limited to this example and the thumbnail object may be disposed on any of the free plates P determined in accordance with a predetermined rule.

As described so far, performing the operation of returning the object to be possessed O to the original location in the virtual space and the operation of adding the object to be possessed O to the personal belongings by the same release operation enables the user to easily add any of the objects in the virtual space to the user's personal belongings without performing a separate operation for displaying the list of personal belongings. Furthermore, the user can take out any of the personal belongings in the list of personal belongings by the same operation as the operation of gripping the object to be possessed O disposed in the virtual space. Thus, both before and after the object to be possessed O is added to the user's personal belongings, the user can operate the object to be possessed O by the same operation.

Moreover, in the example described above, it is assumed that the list of personal belongings includes the six plates P where the personal belongings are disposed. In a case in which the number of objects to be possessed O that can be possessed at a time exceeds this number and the list of personal belongings is displayed in a two-dimensional screen, it is conceivable that the screen is scrolled or switched and the personal belongings the number of which exceeds the number by which the objects to be possessed O can be displayed at a time are presented to the user. However, in a case of disposing the list of personal belongings in the virtual space and presenting the list of personal belongings to the user, such a display method as scrolling possibly gives the user the feeling of strangeness. To address the possibility, therefore, in the case in which the number of personal belongings exceeds the number (six in this example) by which the personal belongings can be disposed in the same plane at a time, the object control section 53 is assumed to dispose the personal belongings along a plurality of planes arranged side by side in a longitudinal direction in a view from the viewpoint.

Figure 6:
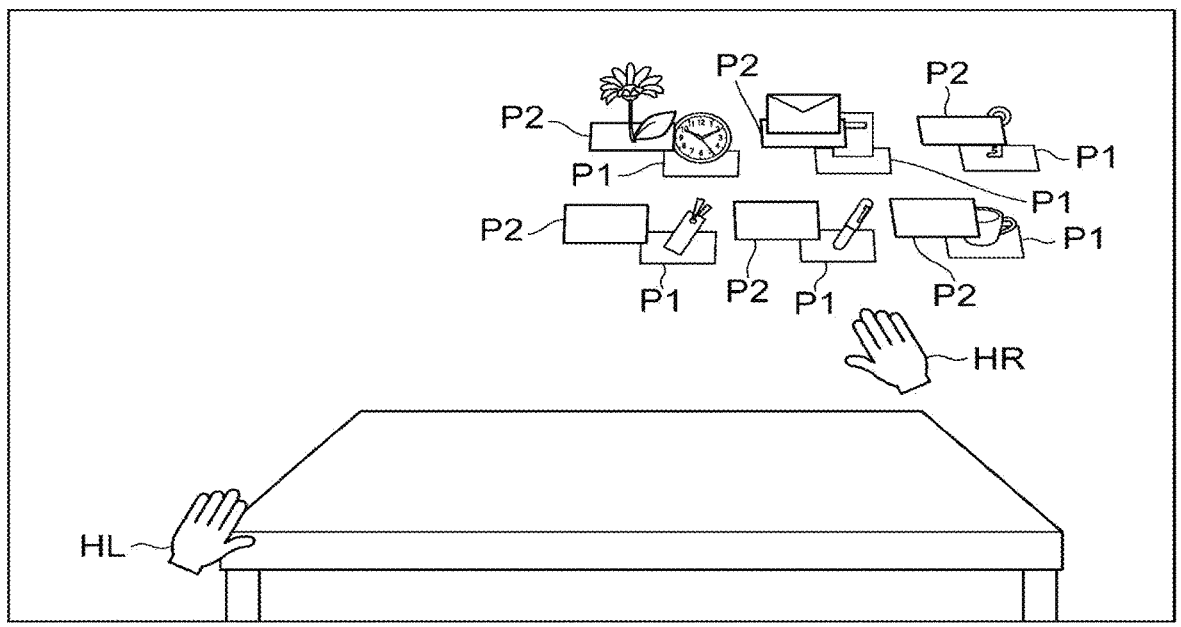
FIG. 6 depicts a state of displaying a list of personal belongings side by side in a depth direction.

FIG. 6 depicts a display example of the list of personal belongings in a case in which the user possesses eight personal belongings more than six by which the personal belongings can be disposed in the same plane at a time. In FIG. 6, six plates P1 where six personal belongings are housed in a chronological order of time of acquisition are disposed along a rear plane in a view from the user. In addition, six plates P2 and thumbnail objects representing two objects to be possessed O (a letter and a flower in FIG. 6) acquired relatively recently are disposed along a front plane in a view from the user (that is, a plane closer to the viewpoint). In this way, disposing the personal belongings along each of a plurality of planes arranged side by side in a depth direction enables many personal belongings in the virtual space to be displayed as the list in a manner with the less feeling of strangeness.

Moreover, in the examples described so far, the plates P disposed along the same plane are disposed to be apart at certain intervals. Thus, the user can see the plates P and the thumbnail objects side by side along the rear plane from through gaps between the plates P side by side along the front plane. It is noted that in this example in FIG. 6, the plurality of planes side by side in the depth direction are parallel to each other and disposed to intersect the visual line direction (direction of the viewpoint) at the timing of displaying the list of personal belongings. In this case, positions of disposing the plates P and the thumbnail objects in the front plane may be shifted from those in the rear plane so that the front and rear thumbnail objects in a view from the visual line direction do not overlap each other. It is thereby possible to avoid a state in which the thumbnail objects disposed in the rear plane are hidden by the thumbnail objects disposed in the front plane and are difficult to view.

Figure 7:
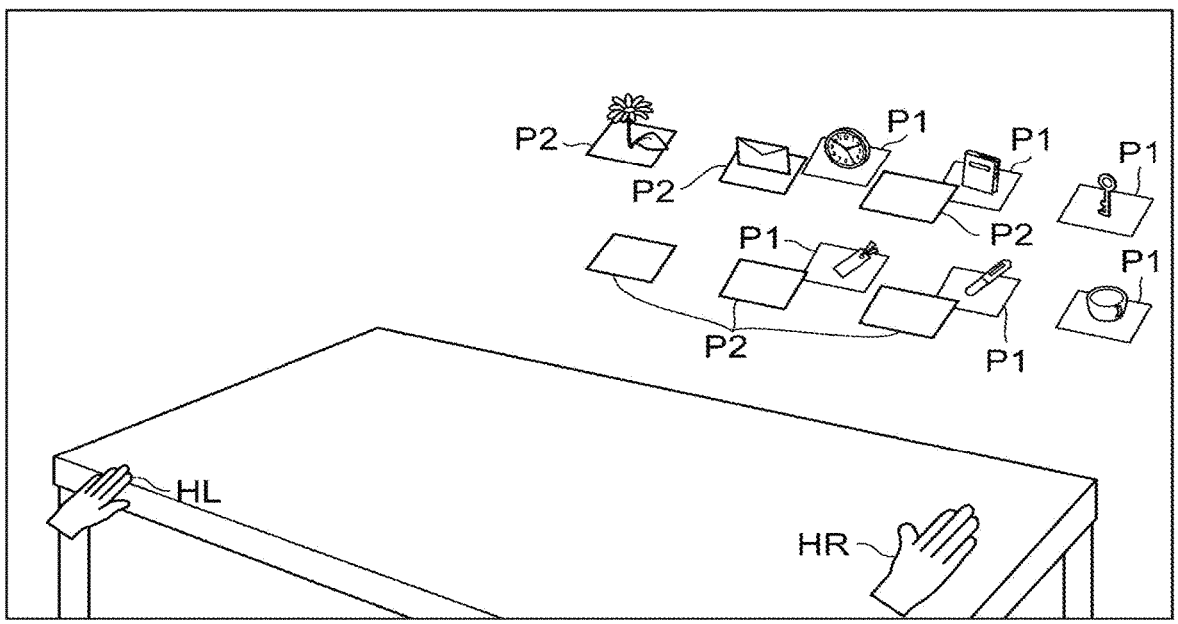
FIG. 7 depicts an aspect of viewing the list of personal belongings side by side in the depth direction from a different angle.

Furthermore, user's moving the head to change the position and the direction of the viewpoint in the state in which the list of personal belongings is disposed along the plurality of planes side by side in the longitudinal direction as described above enables the user to view each plane in which the user's personal belongings are arranged side by side from an oblique direction. The user can thereby easily confirm even the thumbnail objects disposed in the rear plane. In other words, since the objects configuring the list of personal belongings is fixed in the virtual space in the present embodiment, the user can easily grasp each of the personal belongings side by side in the longitudinal direction by moving the viewpoint. FIG. 7 depicts an aspect of viewing the list of personal belongings depicted in FIG. 6 from the oblique direction as described above.

As described so far, the information processing device 10 according to the present embodiment disposes the list of personal belongings at the position in response to the user's viewpoint in the virtual space and adds the object to be possessed O to the list of personal belongings in the case of receiving the housing operation of housing the object to be possessed O, thereby making it possible to add the object to be possessed O to the personal belongings with a method with the less feeling of strangeness and easily in the virtual space. Furthermore, performing the housing operation as the similar operation to the operation of putting (releasing) any of the objects in the virtual space facilitates user's understanding the housing operation by intuition.

It is noted that embodiments of the present disclosure are not limited that described so far. For example, while it has been described above that the user can typically perform any of the operation of returning the object to be possessed O to the original position (position before gripping) and the operation of adding the object to be possessed O to the list of personal belongings after gripping the object to be possessed O, the operation on the object to be possessed O is not limited to these operations. For example, the user may put the object to be possessed O at a different location from the original position in the virtual space. In this case, the object control section 53 may change a processing content depending on whether the position of the object to be possessed O at the timing of user's performing the release operation is a position at which the object to be possessed O can be disposed such as a position on the other object. Specifically, in a case of user's performing the release operation at the position at which the object to be possessed O can be disposed, the object control section 53 may determine to dispose the object to be possessed O at the position. In a case of user's performing the release operation at a location other than the position, the object control section 53 may determine to display the list of personal belongings and to add the object to be possessed O to the user's personal belongings.

Moreover, while it has been described above that the operation of user's gripping the object corresponds to the operation of keeping to depress the trigger button and that the release operation is the operation of taking the user's finger off the trigger button, these operations are given as examples and the information processing device 10 may receive an operation different in content from these operations from the user. For example, the object control section 53 may exercise control such that the object to be possessed O is gripped by the hand object HR or HL in the case of receiving an operation of user's depressing a predetermined button once, and that the object to be possessed O is disposed in the virtual space or housed as a personal belonging in a case of depressing the same button one more time after receiving the operation as the release operation. Furthermore, while it has been described above that the user holds the two operation devices 30L and 30R by user's both hands and operates the operation devices 30L and 30R, respectively, the user may hold one operation device 30L or 30R by one of the hands and perform an instruction operation. Moreover, the housing operation and the takeout operation are not limited to operations on the operation devices 30R and 30L but may be a gesture operation by a hand or finger motion or the like.

Furthermore, a configuration of the list of personal belongings described so far is also given as an example and contents of the list of personal belongings may be any of various kinds of contents. For example, the number of the personal belongings displayed at a time or a way of disposing the personal belongings may be other than those described so far. Moreover, while it has been described above that the list of personal belongings is displayed by disposing the thumbnail objects on the plates P side by side at predetermined intervals, the plates P may have a shape different from that described in the examples so far or the plates P are not always disposed in the first place.

Further, it has been described above that the information processing device 10 identifies the changes in the positions of the operation devices 30R and 30L and the display device 40 by the images captured by the cameras 20. However, the present disclosure is not limited to this implementation. For example, the information processing device 10 may detect the motion of the user's face or hands by various methods such as use of detection results of motion sensors incorporated in the operation devices 30R and 30L and the display device 40.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2018-092246 filed in the Japan Patent Office on May 11, 2018, the entire content of which is hereby incorporated by reference.

What is claimed is:

1. A non-transitory computer readable medium having stored thereon a program for controlling an information processing device, the program comprising:
    by a spatial image rendering section, rendering a spatial image that depicts an aspect of an interior of the virtual space on a basis of a position and a direction of a given viewpoint,
    wherein a plurality of virtual objects are disposed in the virtual space at fixed positions;
    receiving an operation from a user to possess a first virtual object of the plurality of virtual objects,
    wherein the first virtual object is possessed by movement of the first virtual object away from its fixed position by a predetermined distance;
    by an operation receiving section, receiving a housing operation of adding the object to be possessed to personal belongings of the user from the user, and
    by an object control section, displaying a list of personal belongings to which the first virtual object has been added at a position in the virtual space determined depending on the position and the direction of the viewpoint at a time of receiving the housing operation,
    wherein the list of personal belongings is automatically displayed after the first virtual object has been possessed,
    wherein the housing operation is an operation of releasing the first virtual object from a state of gripping after movement of the virtual object by a distance greater than the predetermined distance, and
    wherein the list of personal belongings is automatically displayed after releasing of the first virtual object from the state of gripping.

2. The non-transitory computer readable medium according to claim 1, wherein the list of personal belongings is displayed along a plane intersecting the direction of the viewpoint.

3. The non-transitory computer readable medium according to claim 2, wherein the list of personal belongings is displayed along a plurality of planes intersecting the direction of the viewpoint and arranged side by side along a longitudinal direction in a view from the viewpoint in the case in which the number of personal belongings exceeds a predetermined number.

4. The non-transitory computer readable medium according to claim 1, wherein a display position of the list of personal belongings is varied depending if the state of gripping was performed with a left hand of the user or a right hand of the user.

5. An information processing device comprising:
    a spatial image rendering section rendering a spatial image that depicts an aspect of an interior of the virtual space on a basis of a position and a direction of a given viewpoint,
    wherein a plurality of virtual objects are disposed in the virtual space at fixed position;
    an operation receiving section receiving an operation of possessing a first virtual object of the plurality of virtual objects by moving the first virtual object a predetermined distance away from its fixed distance,
    wherein the first virtual object is added to a list of personal belongings of the user; and
    an object control section displaying the list of personal belongings, including the first virtual object, at a position in the virtual space immediately after completion of the operation of possessing the first virtual object,
    wherein the housing operation is an operation of releasing the first virtual object from a state of gripping after movement of the virtual object by a distance greater than the predetermined distance, and
    wherein the list of personal belongings is automatically displayed after releasing of the first virtual object from the state of gripping.

6. A control method for an information processing device comprising:
    rendering a spatial image that depicts an aspect of an interior of the virtual space on a basis of a position and a direction of a given viewpoint,
    wherein a plurality of virtual objects are disposed in the virtual space at fixed positions;
    receiving an operation of possessing a first virtual object of the plurality of virtual objects by moving the first virtual object a predetermined distance away from its fixed distance,
    wherein the first virtual object is added to a list of personal belongings of the user; and
    displaying the list of personal belongings, including the first virtual object, at a position in the virtual space immediately after completion of the operation of possessing the first virtual object,
    wherein the housing operation is an operation of releasing the first virtual object from a state of gripping after movement of the virtual object by a distance greater than the predetermined distance, and
    wherein the list of personal belongings is automatically displayed after releasing of the first virtual object from the state of gripping.

* * * * *